United States Patent [19]

Gerstein

[11] Patent Number: 5,011,100

[45] Date of Patent: Apr. 30, 1991

[54] KITE

[76] Inventor: Richard Gerstein, 2711 Euclid St., #B, Santa Monica, Calif. 90405

[21] Appl. No.: 463,174

[22] Filed: Jan. 10, 1990

[51] Int. Cl.⁵ ............................................. B64C 31/06
[52] U.S. Cl. ................................. 244/153 R; 244/145
[58] Field of Search ................... 244/153 R, 145, 142; 43/4, 43.13

[56] References Cited

U.S. PATENT DOCUMENTS

| | | | |
|---|---|---|---|
| 2,089,140 | 8/1937 | Tricau | 244/145 |
| 3,098,634 | 7/1963 | Finklea | 244/153 R |
| 3,285,546 | 11/1966 | Jalbert | 244/145 |
| 3,559,931 | 2/1971 | Pohl | 244/145 |
| 3,780,970 | 12/1973 | Pinnell | 244/142 |
| 3,806,071 | 4/1974 | Brown | 244/153 R |
| 4,768,739 | 9/1988 | Schnee | 244/153 R |

OTHER PUBLICATIONS

More than one year prior to the filing date, applicant, who was serving in Germany as a musician, lent a sample of the kite to two fishing experts with the understanding that they conduct tests to the wearability and usefulness of the kite. Applicant followed up on these experiments and retrieved the kite after conclusion of experimental use.
The Penguin Book of Kites, David Pelham, 1976, pp. 30 and 31, pp. 74 and 75.
Kitelines (Magazine), Spring 1988, p. 15.

Primary Examiner—Joseph F. Peters, Jr.
Assistant Examiner—Anne E. Bidwell
Attorney, Agent, or Firm—Sybil Meloy

[57] ABSTRACT

A foldable kite has a flexible central panel having at least four edges. An even total number of flexible tubes are attached to the central panel, at least one tube being arranged on each of two opposing sides thereof. The flexible tubes are conical in shape so that air entering at the top end of the tube is compressed in a ram-jet action to exit out of a reduced opening at the other end of the tube. The ram-jet action is enhanced by a diaphragm which is centrally arranged within each tube. A rigid support for the central panel is arranged to extend parallel to the side edges thereof. A drogue stabilizes the kite during flight, and additionally functions as a carrying case for the kite.

8 Claims, 4 Drawing Sheets

KITE

BACKGROUND OF THE INVENTION

This invention relates to improvements in kites and in particular to an improved foldable kite which is especially adapted for use in controlled operations such as in tethered flight. The invention is particularly useful for kite fishing applications in widely varying wind conditions, from light breezes to strong winds.

Modern technological uses of kites frequently require continuous flight despite significant wind changes without adjustment or change in the kite configuration. One such use, for example, is a fishing kite which requires flight from approximately 5 miles per hour to 30 miles per hour. The use of a fishing kite greatly expands the extent and range of water over which a fisherman may fish and minimizes the frightening of the fish which occurs when the fishing range is limited to the vicinity of the fishing boat.

The earliest fishing kites were merely conventional kites designed to fly at great heights but were limited in their application to uses relatively near the fishing boat. Thus, where greater latitude is required in the kite with respect to the distances with which it will operate and the type and speed of winds in which it can be used, conventional kites are inadequate. In addition, since conventional kites are not constructed with a water resistent or repellant material, much time is wasted rinsing and drying a kite that has fallen into the water. In fact, fisherman who use conventional kites, typically are required to carry several different types for assorted wind ratings and to avoid wasting time attempting to rinse and dry a kite that has fallen in the water.

In an attempt to solve the range and wind problems associated with conventional kites, simple parachute type devices were looked to. However, because parachute type devices require a multitude of shrouds, in the sense of a plurality of sails and keels, these too have proven inadequate.

The present invention provides a kite combining the advantageous features of both a kite and a parachute enabling a fisherman to fly it in a variety of velocities of wind without the necessity of changing kites for bearing wind velocities.

More specifically, an object of this invention is to provide a kite capable of stable flight in the strongest of winds likely to be encountered in fishing conditions.

A further object of this invention is a kite able to fly efficiently in both light breezes and strong gusts.

Still a further object of this invention is a kite which is constructed of a plastic such as nylon of sufficient water resistent so that it is capable of being immersed in water and immediately flown without having to dry it out.

The kite of this invention is also inexpensive, durable and easily replaceable, and suitable for continuous operations for hours, at a minimum cost for the purchase and maintenance.

The kite optionally has a tail or drogue for stability in flight which is also capable of functioning as a carrying bag for the kite or to hold weights or lead shots to adjust the weight and altitude with changing wind velocities.

SUMMARY OF THE INVENTION

A foldable kite comprising a flexible central panel and having at least four sides having edges; and an even number of flexible tubes attached to each of two opposed sides of the central panel.

The flexible tubes can be of conical shape so that air entering the top end of the tube is compressed in a ram jet action to exit out of a reduced opening at the other end of said tube. To facilitate this ram jet action, the tube can contain a flexible central diaphragm therein.

The kite can also contain support means generally extending parallel to its side edges.

Finally, the kite can include a drogue, which can be adapted not only to stabilize the kite but also, when not in use, to function as a carrying case for the kite.

BRIEF DESCRIPTION OF THE DRAWINGS

A better understanding of the invention is apparent upon consideration of the following detailed disclosure of the invention taken in conjunction with the accompanying drawings, wherein.

DESCRIPTION OF THE PREFERRED EMBODIMENT

Figure 1:
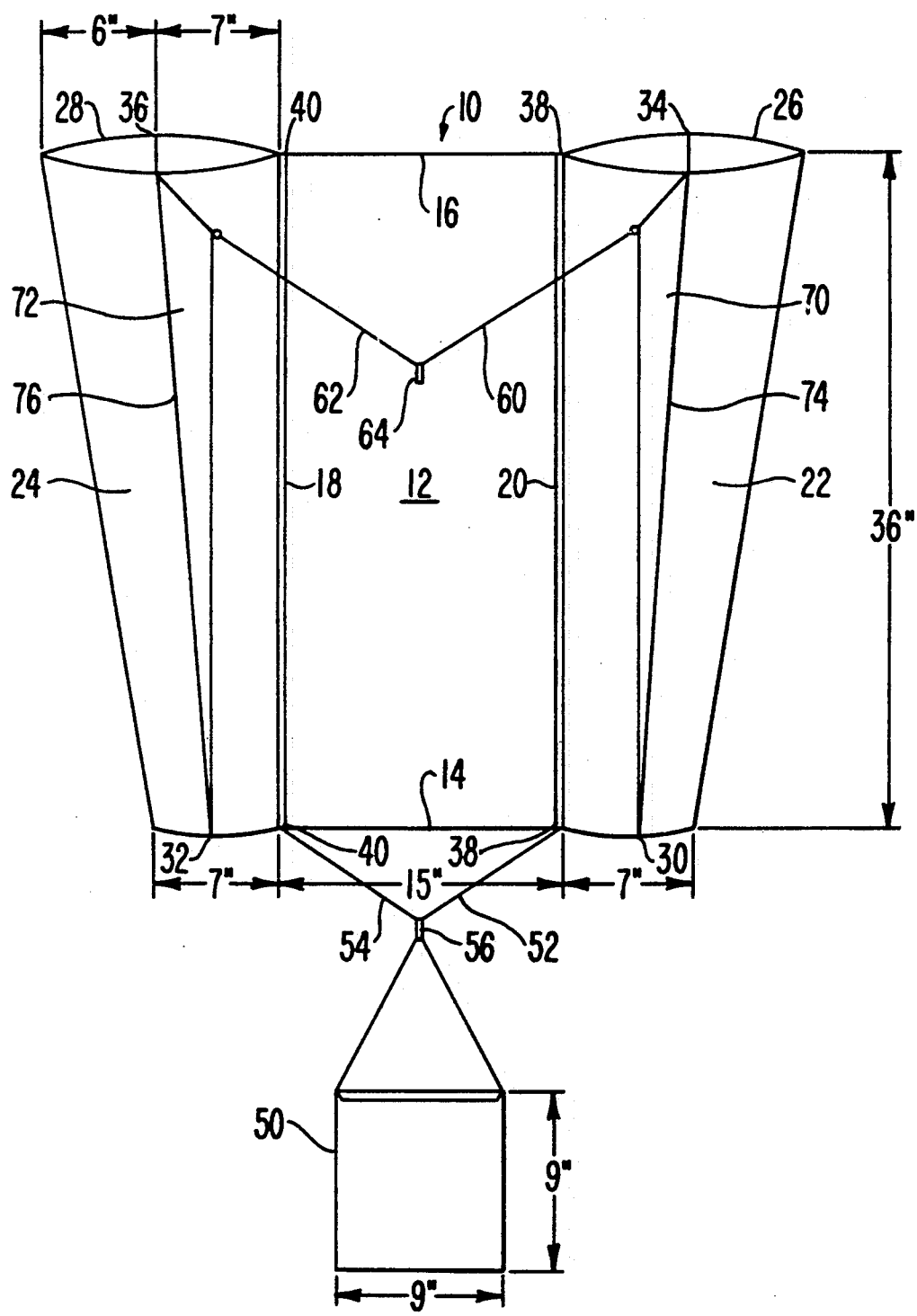
FIG. 1 is a perspective rear view of the kite of this invention.

The kite of the instant invention is shown generally as 10 in FIG. 1.

Kite 10 is provided with a generally rectangular flexible panel 12 having at least four edges, namely bottom edge 14, top edge 16, and side edges 18 and 20.

Kite 10 is provided at side edges 18 and 20 with tubes 22 and 24 generally in the shape of a cone. The conical shape is achieved by providing the portion of the upper portions 26 and 28 of tubes 22 and 24 adjacent the top edge 16 of said panel 12 with a greater peripheral circumference than the lower portions 30 and 32 of tubes 22 and 24 adjacent said lower edge 14 of panel 12. Such a design permits air to flow through the tubes from the upper portions 26 and 28 to the lower portions 30 and 32 and exit from the lower portions 30 and 32 in a jet-like fashion.

The tubes are further provided with diaphragms 34 and 36 which function not only to support the tubes in the air-filled position, but to channel the air flow through. Wooden sticks 38 and 40 provide support for said panel and extend along the two opposed sides of said panel and along the edge of said tubes 22 and 24.

Figure 2:
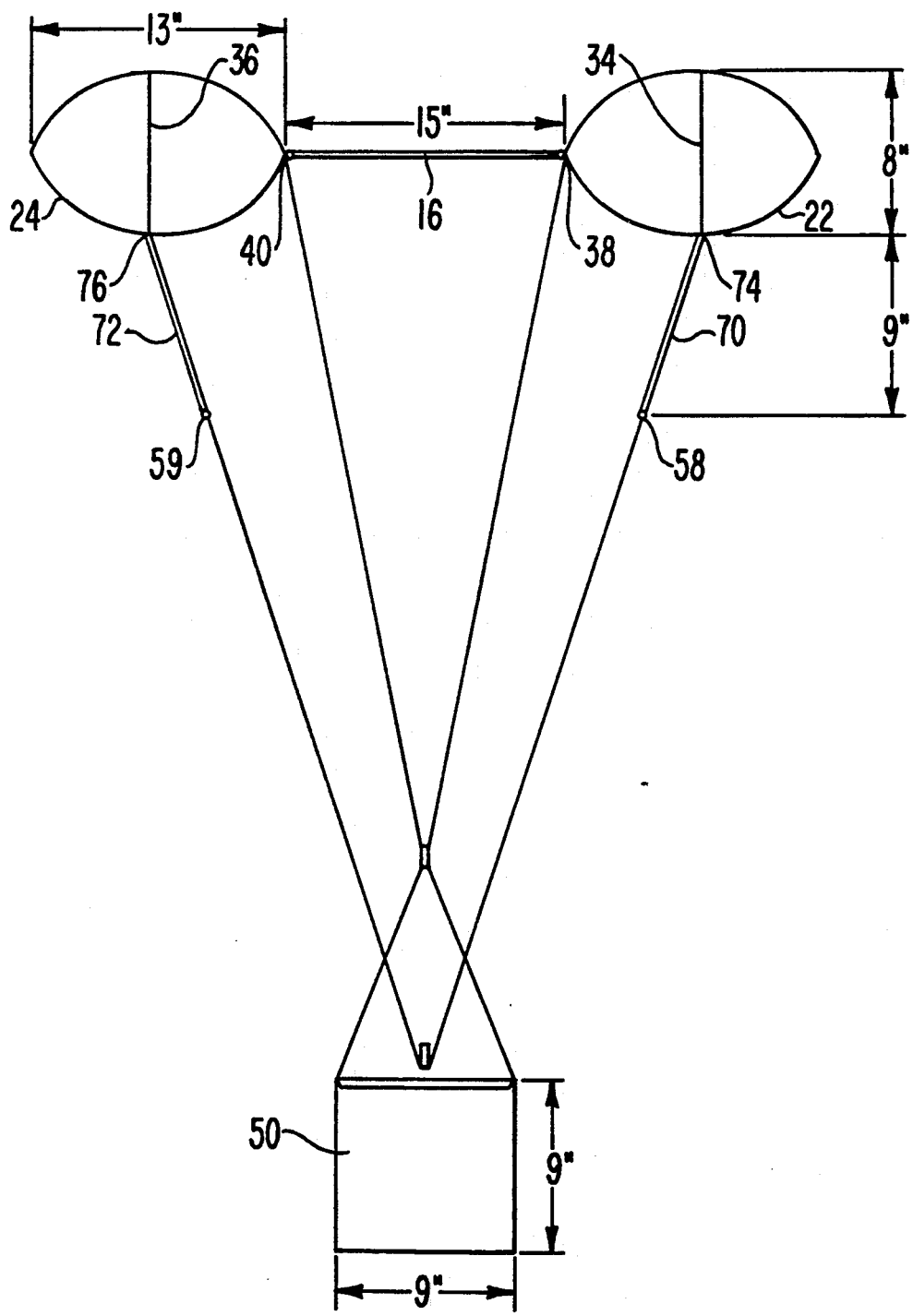
FIG. 2 is a perspective top view of the kite of this invention showing the central panel with the side tubes.

The kite additionally contains two wings 70 and 72 positioned along the sides of the panel at the junction with the diaphrams 34 and 36 as shown in FIG. 2.

The kite also contains a drogue 50 shaped in the form of a pocket. This drogue 50 functions as a tail to help stabilize the kite and which can hold weights to adjust for varying winds. The drogue 50 can also be used as a carrying case for the kite when not in use.

Various fishing lines can be used when the kite is used. The drogue 50 is attached to the kite body by means of a pair of lines attached conventiently to a portion of the tubes 22 and 24 shown as 52 and 54 in FIG. 1, which lines are gathered at a swivel means shown as 56. The swivel enables the drogue to turn in the wind and thus provide greater stability without rocking as if it were in a more fixed position.

Figure 4:
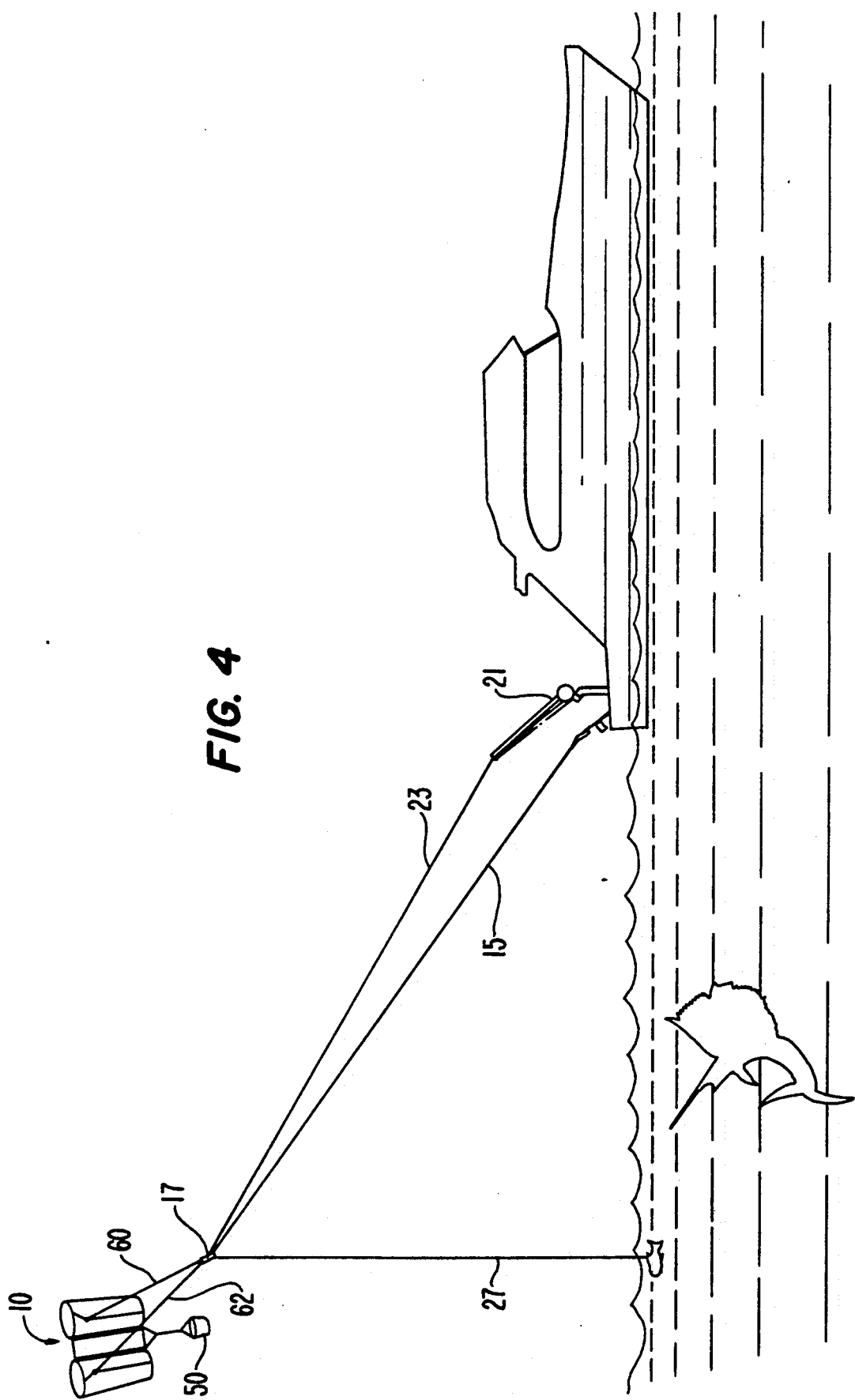
FIG. 4 is the right side elevational view of the kite used with a fishing system showing the kite flying from a conventional rod and reel and a second rod and reel having the fishing line attached to the kite by way of a kite line clip and fishing line release pin.

The kite itself is held by a pair of bridle strings 60 and 62 joined in a loop 64. In use, as shown in FIG. 4, the kite is fixed to a clip via the loop tie, through which the fishing lines are strung.

The panel 12, tubes 22 and 24, and diaphragms 36 and 34, as well as the drogue 50 can be made of any limp or collapsible material such as thin nylon cloth, plastic sheeting, paper or like material which will automatically spread to the wind without any manual effort if the panel 12 is positioned in the wind. Thus, upon positioning in the wind, when the kite is exposed limply to a breeze, air enters the upper portion 26 and 28 of tubes 22 and 24 and is compressed in a ram jet action to exit out of the lower portions 30 and 32 of tubes 22 and 24.

As shown in FIGS. 1 and 2, the kite of this invention preferably includes wings 70 and 72 of generally triangular shape. Edges 74 and 76 are joined to the side of tubes 22 and 24 respectively. The wings and adjacent tubes are preferably supported by wooden sticks 38 and 40 along the point of joinder. The wings are preferably of triangular shape, particular a scalene triangle, although any other shape can be used or optionally the wings can be omitted.

FIG. 2 shows a top of the kite. Diaphragms 34 and 36 are conveniently positioned to radially divide the tube along its central axis. One end of the diaphragm is attached to the tube along a line through which one end of ties 58 and 59 are located. Wooden sticks 38 and 40 are positioned and panel 12 is joined to the tubes at a 90 degree angle to the radial diaphrams 34 and 36 in tubes 22 and 24.

In the foregoing configuration, edge 16 of panel 12 can function as the leading edge of said kite, while side 14 constitutes the trailing edge.

As the air flows through the tubular construction, its velocity is retarded, thus increasing the pressure within the tube and providing a stiffening and opening of the tubular member, which stiffening and opening is aided by the central diaphragm. Thus, when air exits through the tube, the jet effect provides a down wash which generates lift to the kite body.

Preferred materials for construction of the kite are "Rip Stop nylon" for the tube, diaphragm, and panel, with 20-30 lb dacron line using rip stop nylon minimizes extension of tears in the kite.

Figure 3:
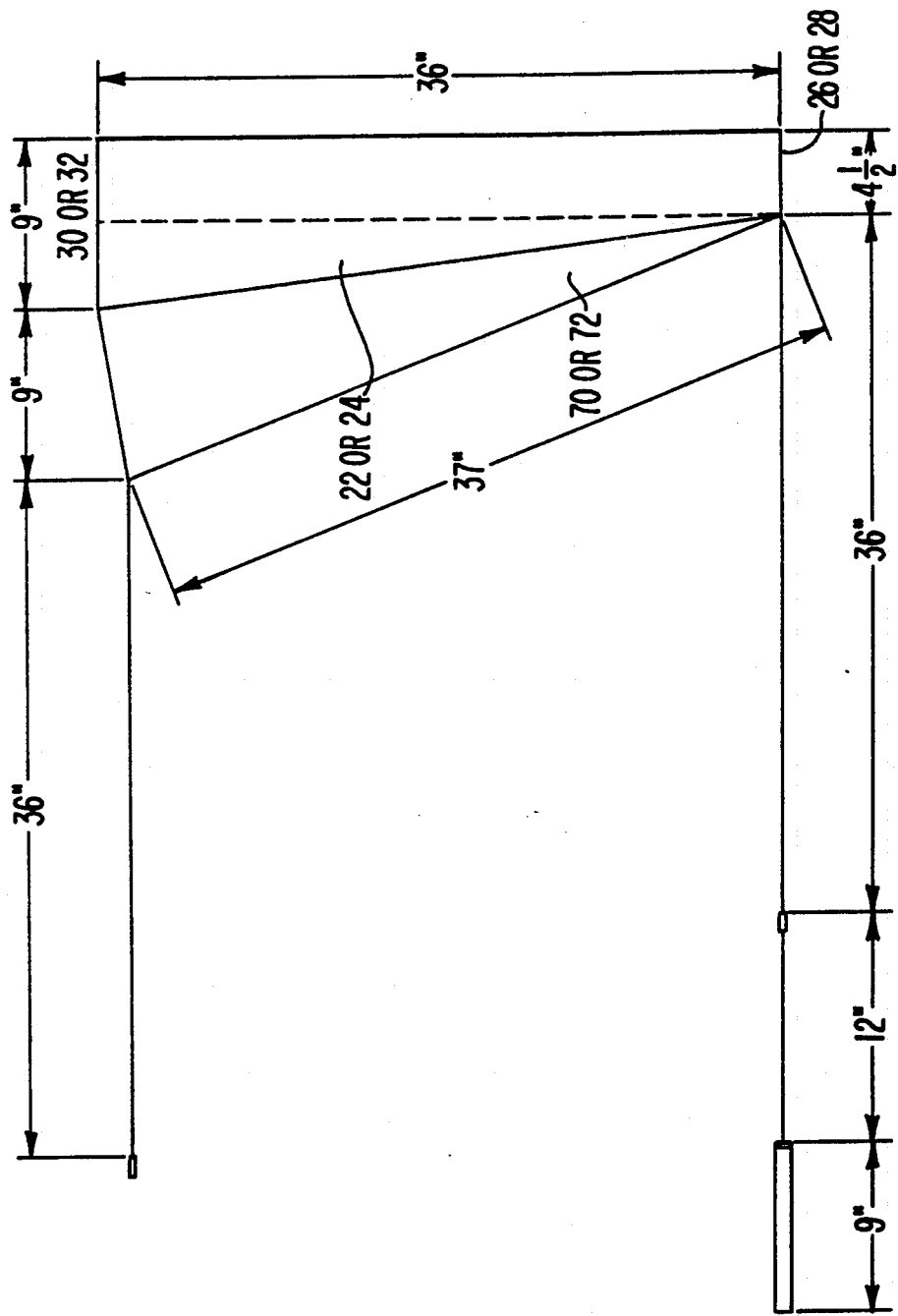
FIG. 3 is a side view of the tube of the kite of this invention.

As shown in FIGS. 1 and 3, the wings 70 and 72 are conveniently triangular in shape.

FIG. 4 shows the kite employed in a fishing system. Kite line 15 is attached to kite 10 via outrigger clip 17 which is connected to a loop tie with a conventional swivel. Fishing rod and reel 21 could be any conventional rod and reel including spinning or bait-casting models. Fishing rod and reel 21 with fishing line 23 extends along and almost parallel to kite line 15 until reaching outrigger clip 17. Fishing line 23 extends through the outrigger clip thus allowing a conventional hook with bait on lower line 27 to extend into the water. Kite line 15 attaches to the outrigger clip 17 for attachment to the kite. Suitable clips and lines are those known for use with fishing kites.

In use, the kite with lines 60 and 62, as well as the drogue 50, is merely exposed to the breeze for the air to act against the central panel 12, whereby the kite is immediately lifted into the air. The lifting is facilitated by designing the tubes as cones to take advantage of a ram jet action and to design the interior of the tubes with the diaphragms. The breeze thus is guided through the cone from the top portions 26 and 28 through the body of the cone and out through rear portions 30 and 32. The kite is thus spread into flying configuration and becomes immediately airborne at a very steep angle approaching vertical. The breeze maintains the tubes 22 and 24 in their inflated condition, which, along with diaphragms 34 and 36 retains the kites shape regardless of the strength of the wind without any tendency of the tubes to bag in response to the force of the wind.

Although specific designs, materials and methods have been stated herein in describing the preferred embodiment of the invention, other suitable designs, materials and steps may be used with satisfactory results and varying degrees of efficiency. It is understood that other designs, materials, steps, arrangements of parts have been described and illustrated in order to explain the nature of the invention. This invention should not be construed in spirit or in scope to be limited to the foregoing recitals.

What is claimed is:

1. A foldable kite, comprising;
   a flexible panel having at least four sides formed by a top edge, a bottom edge, and two side edges;
   an equal number of flexible tubes adjacent each of said side edges of said flexible panel, each of said tubes having a respective central axis generally parallel to said adjacent side edges of said flexible panel, and said flexible tubes having an opening at each end configured to allow air to flow therethrough about said central axis while in flight;
   flexible diaphragm contained within each of said flexible tubes, dividing said flexible tube into at least two portions;
   support means for said flexible panel generally extending parallel to side edges; and
   at least two flexible wings, each positioned along a respective one of said flexible tubes each of said wings being generally triangular in shape and having one side which is generally of the same length as a respective one of said flexible tubes.

2. The foldable kite of claim 1, wherein said flexible panel is generally of rectangular shape.

3. The foldable kite of claim 2, in which said flexible panel is generally of square shape.

4. The foldable kite at claim 1, in which said diaphragm is arranged to extend substantially along said central axis of said tube.

5. The foldable kite of claim 4, in which said flexible tubes are generally of conical shape and taper inwardly from said top edge of said flexible panel to said bottom edge of said flexible panel.

6. The foldable kite of claim 1, wherein there is further provided a drogue attached at said bottom edge of said flexible panel.

7. A foldable kite, comprising;
   a generally square, flexible panel having a top edge, a bottom edge and two side edges;
   two flexible tubes of generally conical shape joined along their respective lengths to respective ones of said side edges of said flexible panel, said flexible tubes having an opening at each end configured to allow air to flow therethrough and tapering downwardly from said top edge to said bottom edge;
   two flexible diaphragms, each contained within a respectively associated one of said flexible tubes and located substantially along a central axis of said respectively associated one of said flexible tubes;
support means for providing rigid support to said flexible panel;
at least two flexible wings, said flexible wings being substantially triangular in shape and each being arranged to extend substantially along the entire length of a respective one of said flexible tubes; and
a drogue attached to said flexible panel.

8. A foldable kite comprising:
a flexible central panel having at least four sides, two of which are in parallel relationship;
an even number of flexible tubes attached to each of said generally parallel sides;
a central diaphragm contained within said tubes; and
at least two flexible wings, each being positioned along a respective one of said flexible tubes, each of said wings being generally triangular in shape and having one side which is generally of the same length as said respectively associated flexible tubes.

* * * * *